United States Patent [19]

Okada

[11] Patent Number: 4,530,873

[45] Date of Patent: Jul. 23, 1985

[54] SWEAT-ABSORBENT TEXTILE FABRIC

[75] Inventor: Hozuma Okada, Kyoto, Japan

[73] Assignee: Sakashita Co., Ltd., Kyoto, Japan

[21] Appl. No.: 629,498

[22] Filed: Jul. 10, 1984

Related U.S. Application Data

[63] Continuation-in-part of Ser. No. 434,707, Oct. 15, 1982, abandoned.

[30] Foreign Application Priority Data

Oct. 15, 1981 [JP] Japan .......................... 56-153624[U]
Nov. 13, 1981 [JP] Japan .......................... 56-169843[U]

[51] Int. Cl.³ .............................................. B32B 7/00
[52] U.S. Cl. ................................... 428/253; 428/246;
428/252; 428/254; 428/297; 428/423.1;
428/913
[58] Field of Search ............... 428/246, 253, 254, 297,
428/423.1, 913

[56] References Cited

U.S. PATENT DOCUMENTS

| 3,374,142 | 3/1968 | Kreckl | 428/252 |
| 4,194,041 | 3/1980 | Gore et al. | 428/252 |
| 4,344,999 | 8/1982 | Gohlke | 428/212 |
| 4,465,730 | 8/1984 | Okada | 428/248 |

Primary Examiner—James J. Bell
Attorney, Agent, or Firm—Wenderoth, Lind & Ponack

[57] ABSTRACT

A sweat absorbent textile fabric suitable as a material for outerwears including sportwears comprises a water absorbent fabric layer having a high moisture absorbency and a water permeable fabric layer having a low moisture absorbency and a high moisture permeability. These fabric layers may be integrally connected, such as by knitting or by the use of a bonding agent, together to provide a double-layered fabric structure. When in use, the combination of these fabric layer is used together with an outer fabric layer to be positioned on one side of the water absorbent fabric layer opposite to the water permeable fabric layer.

8 Claims, 8 Drawing Figures

SWEAT-ABSORBENT TEXTILE FABRIC

This is a continuation-in-part application in connection with U.S. Pat. Ser. No. 434,707, filed on Oct. 15, 1982, abandoned and assigned to the same applicant.

BACKGROUND OF THE INVENTION

The present invention generally relates to a textile fabric and, more particularly, to a highly sweat-absorbent textile fabric suited as a material for jackets, raincoats, sweatshirts, warm-up suits, snowsuits, skisuits, parkas, anoraks, sweaters, and the like outerwears.

Hitherto, an outerwear or outer garment, particularly, a sportwear, is made out of a textile fabric excellent in thermal insulation or a two-ply textile fabric having inner and outer linings with or without a fiberfill, such as down or cotton, sandwiched between the inner and outer linings.

Since the conventional textile fabric for the outerwears referred to above is required to have a high thermal insulation, a high windbreak performance and/or a high water repellency, the gas permeability thereof is more or less sacrificed. For example, when one wears a certain outerwear over the underwear, the sweat excreted from the body of the wearer can hardly be exhaled through the outerwear and, when cooled, may gather into minute drops of moisture which subsequently wet the underwear and/or form upon the inner surface of the textile fabric. Thus, the conventional textile fabric is likely to result in the substantial enclosure of moisture inside the shell of the outerwear. When the moisture inside the shell of the outerwear is saturated, the sweat excreted from the body of the wearer immediately into minute drops of moisture, or the moisture readily condenses into minute drops of liquid by the effect of the difference in temperature between the inside and the outside of the outerwear. If this happens, the body of the wearer is wetted to such an extent as to cause the wearer to feel uncomfortable to continue wearing it.

Furthermore, the conventional sportwear is typically made out of a textile fabric having a cotton inner lining which, when held in contact with the body skin of the wearer, exhibits a high sweat absorbency. Since the use of the cotton inner lining has been found disadvantageous in that it tends to lose its once-designed shape so readily as to reduce the aesthetic feature of the sportwear, polyester has come to be used as a material for the inner lining or a material for the sportwear as a whole. Considering the fact that the sportwear, particularly the warm-up suit, is oftentimes worn on during sport activity, the polyester sportwear fails to exhibit a moisture absorbency, particularly a sweat absorbency, with the sweat consequently gathering upon the body of the wearer in the form of minute drops of moisture, and accordingly, it cannot give a comfortable feeling to the wearer for a continued period of time.

This equally applies even to the conventional sportwear made out of a blended textile fabric of 50% polyester and 50% cotton or a textile fabric of 100% cotton, because the amount of cotton used for facilitating sweat absorption is relatively small.

SUMMARY OF THE INVENTION

Accordingly, the present invention has been developed with a view to substantially eliminating the disadvantages inherent in the prior art textile fabric and has for its essential object to provide an improved textile fabric of a kind excellent in thermal insulation and also in sweat absorbency.

Another object of the present invention is to provide an improved textile fabric of the kind referred to above which is most suited as a material for sportwears.

It is, accordingly, a related object of the present invention to provide a sportwear designed by the use of the improved textile fabric of the kind referred to above.

A sweat absorbent textile fabric provided herein according to the present invention comprises a first fabric layer having high water permeability and low moisture absorbency and a second fabric layer having a high moisture absorbency substantially higher than said first fabric layer in such that, when in use, the first fabric layer permits moisture to pass therethrough while the second fabric layer absorbs the moisture to keep the first fabric layer dry, the second fabric layer having a capacity to absorb moisture which is 200 to 300% by weight greater than that of the first fabric layer, the first fabric layer having a coarse stitching of 30 to 300 deniers while the second layer has a stitching of 40 deniers or more, providing that the second fabric layer has a finer stitching than the first fabric layer, and the first fabric layer being selected from the group consisting of polyvinyl chloride having a water retentivity within the range of 0 to 3.0% at 20° C. and 95% humidity and a relative thermal conductivity of 6.4 when that of air is taken as 1, a polyester having a water relativity within the range of 0.6 to 0.7% at 20° C. and 95% humidity, and nylon having a water retentivity within the range of 8.0 to 9.0% at 20° C. and 95% humidity, while the second fabric layer is selected from the group consisting of cuprammonium rayon having a water retentivity of 21.0 to 35.0% at 20° C. and 95% humidity, rayon having a water retentivity of 25.0 to 30.0% at 20° C. and 95% humidity and cotton having a water retentivity of 24 to 27% at 20° C. and 95% humidity.

In addition, the present invention is also applied to a sportwear made out of a sweat absorbent knitted textile fabric comprising an outer fabric layer, a water absorbent fabric layer and a water permeable fabric layer all being knitted integrally, said outer fabric layer being represented by a fabric having a good water vapor permeability, said water absorbent fabric layer positioned between the outer fabric layer and the water permeable fabric layer having a high water permeability and a low moisture absorbency and begin knitted coarser than the water absorbent layer such that, when in use, the water permeable fabric layer permits moisture to pass therethrough while the water absorbent fabric layer absorbs the moisture to keep the water permeable fabric layer dry, the outer fabric being a knitted fabric having durability against the wind and rain and has good warmth retentivity, and the water absorbent layer being selected from the group consisting of cuprammonium rayon having a water retentivity of 21.0 to 25.0% at 20° C. and 95% humidity, rayon having a water retentivity of 25.0 to 30.0% at 20° C. and 95% humidity and cotton having a water retentivity of 24 to 27% at 20° C. and 95% humidity, while the water permeable layer is selected from the group consisting of polyvinyl chloride having a water retentivity within the range of 0 to 3.0% at 20° C. and 95% humidity and a retentive thermal conductivity of 6.4 when that of air is taken as 1, a polyester having a water retentivity within the range of 0.6 to 0.7% at 20° C. and 95% humidity, and nylon having a water retentivity within the range of 8.0 to 9.0% at 20° C. and 95% humidity.

In one preferred embodiment of the present invention, the highly sweat-absorbent textile fabric comprises an outer layer, which may have an aesthetic feature, a sufficient durability against the rain, etc., a high warm retaining property, a water-proof property, a gas permeability and/or a sufficient physical strength, an intermediate fabric layer having a high water absorbency, and an inner fabric layer having a high water permeability and positioned on one side of the intermediate fabric layer opposite to the outer layer.

In another preferred embodiment of the present invention, the outer layer may be any suitable cloth material, for example, a knitted fabric, a woven fabric, or a leather either natural or synthetic. On the other hand, the intermediate and inner fabric layers are integrated together to provide a double-layered fabric. This double-layered fabric may be either separate from the outer layer or knitted to the outer layer with or without a heat insulating interlining sandwiched therebetween. In either case, the water absorbent fabric layer should be positioned between the outer layer and the water permeable fabric layer.

In a further preferred embodiment of the present invention, the outer layer, the water absorbent fabric layer and the water permeable fabric layer are all integrated, i.e., woven, together and, therefore, constitute a single integer of fabric. Since the textile fabric according to this embodiment is suited as a material for a sportwear, the outer layer should have a sufficient physical strength comparable to or higher than that generally required in the conventional sportswear, in addition to some or all of the other features described hereinbefore.

BRIEF DESCRIPTION OF THE DRAWINGS

These and other objects of the present invention will become clear from the following detailed description of the present invention taken in conjunction with preferred embodiments thereof with reference to the accompanying drawings, in which.

DETAILED DESCRIPTION OF THE INVENTION

Figure 1:
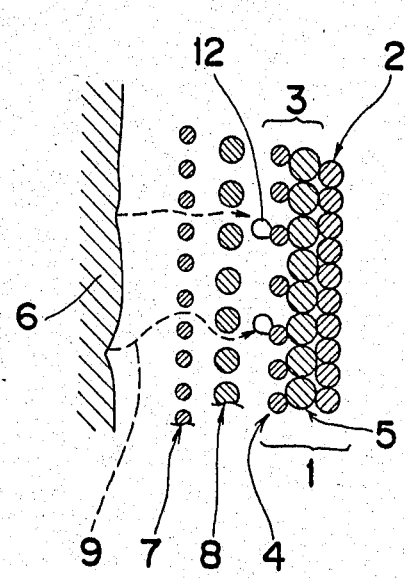
FIG. 1 is a sectional view, somewhat exaggerated, of a portion of an outerwear using a textile fabric according to one preferred embodiment of the present invention.

Before the description of the present invention proceeds, it is to be noted that like parts are designated by like reference numerals throughout the accompanying drawings.

Referring first to FIG. 1, a jacket, only a portion of which is shown by 1 as shown by a wearer represented by a portion 6 of his or her body, is made out of a textile fabric comprising an outer cloth layer 2 having a high warmth retentivity and an inner fabric lining 3 of double-layered structure. The inner fabric lining 3 is comprised of a first fabric layer 4 having a high water permeability and a second fabric layer 5 having a high water absorbency and positioned intermediately between the outer cloth layer 2 and the first fabric layer 4. So far shown, the wearer represented by the body portion 6 is assumed as wearing an undershirt, a portion of which is shown by 7, and an intermediate shirt, a portion of which is shown by 8, all inside the jacket 1.

The inner fabric lining 3 including the double-layered structure of first and second fabric layers 4 and 5 may be either a warp knitted fabric or a weft knitted fabric and can be knitted by the use of any known knitting machine, for example, a raschel machine, a tricot knitting machine or a circulate knitting machine. The number of stitches in the first fabric layer 4 is preferably greater than that in the second fabric layer 5 and this can be attained by adjusting the gauges used in the knitting machine. Alternatively, the inner fabric lining 3 may be a woven fabric.

Preferably, a yarn forming the first fabric layer 4 is of a kind having a high water permeability and a low water retentivity, i.e., a minimized capability of water holding. In addition, the first fabric layer 4 is made out of a yarn smaller in thickness or diameter than that used to make the second fabric layer 5 and is smaller in number of stitches than that in the second fabric layer 5, so that moisture components 9 originating from the sweat which have passed through interstices of both of the undershirt 7 and the intermediate shirt 8 can pass through the interstices of the first fabric layer 4. It is, however, to be noted that, the interstices of the first fabric layer 4 are so sized that minute drops 12 of moisture condensed upon the second fabric layer 5 in a manner as will be described later will not be absorbed by the intermediate shirt 8 through the interstices of the first fabric layer 4.

Specifically, the yarn for the first fabric layer 4 may be that which is made of polyvinyl chloride, polyester, nylon, polypropylene, vinylidene, or vinylon. Of them the polyvinyl chloride having a water retentivity within the range of 0 to 3% at 20° C. and 95% humidity and being excellent in moisture permeability and also in warmth retentivity (a relative thermal conductivity being 6.4 when that of air is taken 1) is most preferred, followed by the polyester having a water retentivity within the range of 0.6 to 0.7% at 20° C. and 95% humidity and the nylon having a water retentivity within the range of 8.0 to 9.0% at 20° C. and 95% humidity. Although both the polyester and the nylon are inferior in water retentivity to the polyvinyl chloride, the inner fabric lining 3 utilizeable satisfactorily in the practice of the present invention can be obtained if the first fabric layer 4 is made coarse in stitch. It is to be noted that the polyvinyl chloride yarn referred to above is commercially available from Teijin Co., Ltd. of Japan under the trade name "Tevilon".

On the other hand, the second fabric layer 5 is made of a relatively thick yarn having a relatively high water retentivity and is finer in stitch than the first fabric layer 4, so that the moisture components 9 which have passed through the first fabric layer can be caused to condense and then to be absorbed thereby, without any possibility of allowing some of the once-absorbed moisture components to be soaked into the first fabric layer 4 and then into the intermediate shirt 8 even when the inner fabric layer 3 has become heavier than the outer cloth layer 2 as a result of the soaking of the moisture components 9. In addition, the second fabric layer 5 is preferred to have a thickness sufficient to allow it to absorb the sweat.

Specifically, the yarn forming the second fabric layer 5 may be that which is made of cuprammonium rayon of a kind having a water retentivity of 21.0 to 25.0% at 20° C. and 95% humidity, rayon of a kind having a water retentivity of 25.0 to 30.0% at the same conditions, cotton of a kind having a water retentivity of 24 to 27% at the same conditions, a water-adsorbent nylon or acrylic ester. A composite yarn comprising a polyurethane elastic yarn (sold under the trade name "Spandex") and a water adsorbent yarn wound around the elastic yarn may also be employed as a material for the second fabric layer 5.

Figure 2:
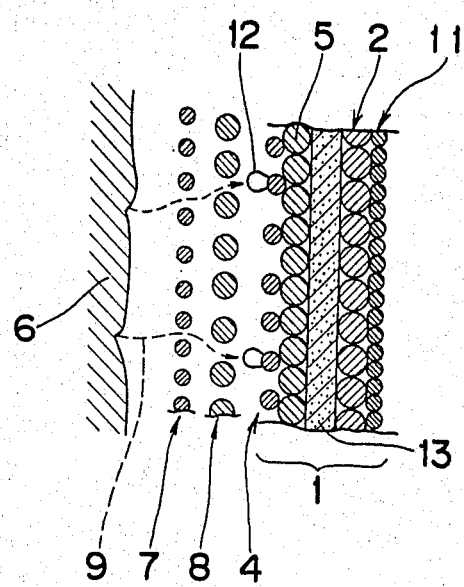
FIGS. 2 to 4 are views similar to FIG. 1, showing modified textile fabrics according to the present invention, respectively.

The outer cloth layer 2 forming the outermost layer of the jacket 1 is preferred to have an aesthetic feature as well as a durability against the wind, the rain, etc., and may be any one of a leather, a woven fabric and a knitted fabric which is preferably applied with a water repellent agent or the like to impart a warmth retentivity. Where the warmth retentivity is desired to be increased, the surface of the outer cloth layer 2 facing the inner fabric lining 3 may be lined with a layer 13 of warm material such as foamed neoprene, urethane, down or cotton such as shown in FIG. 2. It is to be noted that, in FIG. 2, the outer cloth layer 2 is shown as having a water repellent layer 11 applied on the surface thereof opposite to the layer 13 of warm material.

The outer cloth layer 2 and the inner fabric lining 3 may be either separate from each other or connected together. Where the both are desired to be connected together, they may be bonded together by the use of a bonding agent or by the use of a fusion bonding technique, or they may be simultaneously knitted together. Alternatively, the outer cloth layer 2, the water permeable layer 4 and the water absorbent layer 5 are all knitted together by the use of a known double raschel machine or a known circular knitting machine to provide a single integer and, in such case, no connecting work which is required where the outer cloth layer 2 and the inner fabric layer 3 are separately fabricated, is required, thereby reducing the manufacturing cost of the textile fabric of the present invention.

The textile fabric according to the present invention and having such a structure as hereinabove described functions in the following manner.

Figure 7:
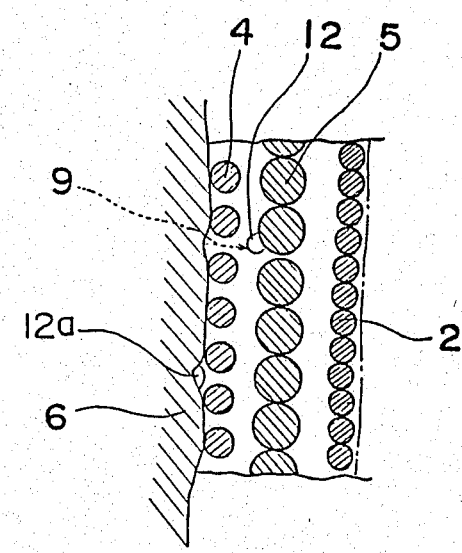
FIG. 7 is a view similar to FIG. 1, showing the textile fabric according to another embodiment of the present invention.
Figure 8:
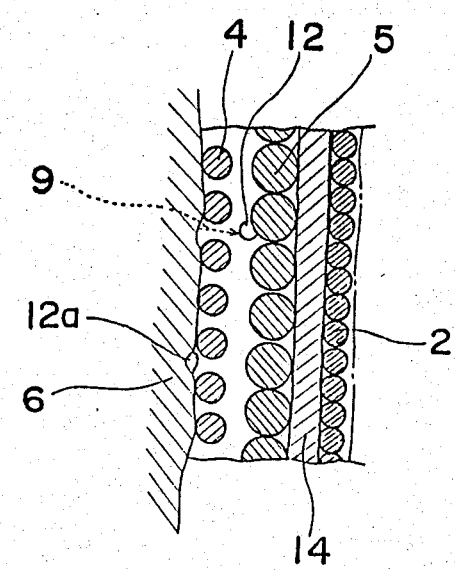
FIG. 8 is a view similar to FIG. 7, showing a modification thereof.

In general, the sweat excreted from the human body can be broadly classified into the moisture components 9 evaporated from the skin and liquid droplets 12a remaining on the skin (as shown in FIGS. 7 and 8).

The jacket 1 covering the undershirt 7 on the wearer's body 6 and also the intermediate shirt 8 which is generally worn where more warmth is required such as during the winter season does not directly contact the skin of the wearer in most cases and, therefore, will not act to absorb the liquid droplets of sweat, but the moisture components 9.

The moisture components 9 emanating from the body 6 pass through the undershirt 7 and the intermediate shirt 8 and then through the interstices in the first fabric layer 4 and finally absorbed in the second fabric layer 5. As the moisture content of the second fabric layer 5 increases, the moisture components 9 so absorbed in the second fabric layer 5 condense on the second fabric layer 5 and are then accommodated thereby. Where the second fabric layer 5 is made out of the rayon, cuprammonium rayon or cotton yarns, the second fabric layer 5 is effective to absorb the moisture components to an amount generally equal to 200 to 300% of the weight of the second fabric layer 5 used. Accordingly, the surface of the first fabric layer 4 opposite to the second fabric layer 5 can be kept dry at all times.

The moisture components absorbed in the second fabric layer 5 is expelled in the form of vapor in part to the outside of the jacket 1 through the outer cloth layer 2 and in part through the first fabric layer 4 into a space between the first fabric layer 4 and the intermediate shirt 8.

Since the condensation of the moisture components 9 and the vaporization thereof take place only in the second fabric layer 5 as can readily be understood from the foregoing description, the wetting of the second fabric layer 5 as a result of the condensation of the moisture components 9 results not only in generation of wet heat, but also in absorption of heat of vaporization of the moisture. Therefore, the intermediate shirt 8 and the undershirt 7 both spaced from the second fabric layer 5 with the first fabric layer 4 between the intermediate shirt 8 and the first fabric layer 4 would not be substantially affected by the wetting of the second fabric layer 5 and, accordingly, the jacket 1 is comfortable to wear. In addition, since the first fabric layer 4 can be kept dry at all times, no friction take place during the sport activity and therefore the inner fabric lining 3 is suited as a lining material.

With respect to the corelationship between the type of yarns used to form the first fabric layer 4 and the stitch thereof, the first fabric layer 4 must be so designed as to avoid any possible contact of local areas of the intermediate shirt 8 with the second fabric layer 5 which would otherwise take place through the interstices in the first fabric layer 4 if the latter has an excessively coarse stitch and, also, as to enhance the water permeability. In view of this, the yarn for the first fabric layer 4 is preferably of a type having 30 to 300 deniers and is preferably knitted to have 50 vertical rows per inch (in the case where the yarn used is of a type having 30 deniers) to 14 vertical rows per inch (in the case where the yarn used is of a type having 100 deniers).

On the other hand, the yarn for the second fabric layer 5 is preferably of a type having 40 deniers or more.

By way of example, a polyester fabric having 34 vertical rows per inch and formed by the use of the polyester yarn of a type having 30 deniers is preferred as a material for the first fabric layer 4 while a cupra fabric having 34 vertical rows per inch and formed by the use of the cupra yarn of a type having 50 deniers is preferred as a material for the second fabric layer 5.

As hereinbefore described, since the jacket 1 is made out of the outer cloth layer of high warmth retentivity and the inner fabric lining 3 of double-layered structure consisting of the first and second fabric layers 4 and 5 and provided integrally with the outer cloth layer 2, the combination of these layers 2, 4 and 5 can give such a cumulative effect even though the wearer sweats profusely, but also keeps the wearer feeling warm and in a sanitary condition.

Figure 3:
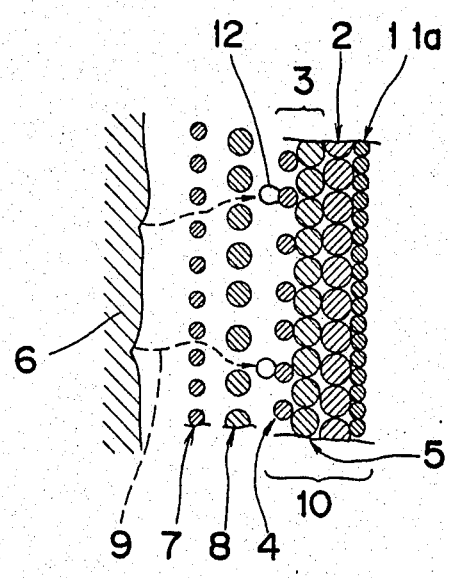

FIG. 3 illustrates an example wherein the textile fabric according to the present invention is used as a material for a raincoat 10. Because of the particular application in which the raincoat 10 is used, the outer cloth layer 2 is lined with a coating of urethane resin, as shown by 11a, to give a water repellency. The urethane coating 11a may be applied to the outer cloth layer 2 in any suitable method, for example, by dipping the outer cloth layer 2 into a urethane bath, applying or spraying urethane to one surface of the outer cloth layer 2, or by laminating a urethane film on one surface of the outer cloth layer 2.

Figure 4:
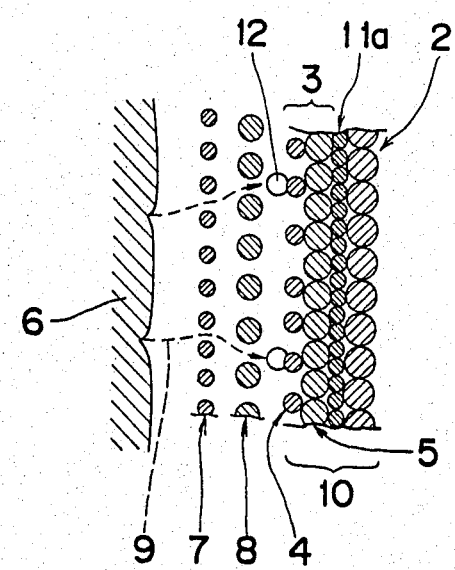

It is to be noted that, in the modification shown in FIG. 3, except for by the dripping method, the urethane coating 11a has been described as formed on one surface of the outer cloth layer 2 opposite to the inner fabric lining 3. However, as shown in FIG. 4, the urethane coating 11a may be formed on the opposite surface of the outer cloth layer 2 adjacent the inner fabric lining 3. In addition, instead of the use of the urethane coating 11a, a rubber, acrylic or polyvinyl chloride lining which has a comparable water repellency to the urethane coating may be employed.

Furthermore, the water repellent coating 11a shown in any one of FIGS. 3 and 4 may be rendered porous with fine perforations of a size sufficient to allow vapor to pass therethrough, but not any liquid, so that the moisture absorbed in the second fabric layer 5 of the inner fabric lining 3 can subsequently be discharged through the perforations in the coating 11a to the outside of the raincoat 10 as it is transformed into a vapor phase.

Alternatively, the outer cloth layer 2 itself may be constituted by a rubber-lined fabric and, in which case, the inner fabric lining 3 may be either fusion-bonded, or bonded by the use of a bonding agent, to the rubber lined fabric.

The textile fabric used in the raincoat functions in a manner similar to that used in the jacket 1 and can, therefore, give an effect similar to that described in connection with the jacket 1. In particular, even when it rains with high humidity, the raincoat is comfortable and warm to wear without causing the wearer to feel stuffy.

So far as the embodiments shown in FIGS. 1 to 4 are concerned, the present invention will now be described by way of examples which are to be understood as set forth only for the purpose of illustration, not limiting the scope of the present invention.

EXAMPLE I

Samples of the conventional nylon twilled fabric and the fabric lining of double-layered structure according to the present invention wherein the water permeable layer 4 and the water absorbent layer 5 are prepared from polyester and cupra fabrics, respectively, were tested as to the gas-permeability, the heat retaining property and the speed of water absorption. The gas permeability was tested by the method stipulated in JIS L-1096A, the heat retaining property by the method stipulated in JIS L-1096A and the water absorption speed by the method stipulated in JIS L-1018C, JIS being an abbreviation of "Japanese Industrial Standards".

The results of the comparison tests are tabulated in Table I below.

TABLE I

|  | Conventional | Invention |
| --- | --- | --- |
| Gas Permeability | 10.4 cm$^3$/cm$^2$/sec. | 341.8 cm$^3$/cm$^2$/sec |
| Heat Retentivity | 26.5% | 53.1% |
| Water Absorb. Speed | 3 hours or more | 2 sec. |

In addition thereto, it has been found that the percentage of water residue was 67% in the conventional nylon twilled fabric and 25% in the double-layered fabric lining of the present invention.

EXAMPLE II 6 samples of fabric linings, identified respectively by A, B, C, D, E and F, of different kinds as described later, were tested as to the speed of water absorption according to the method stipulated in JIS L-1096A, the water absorbency according to the method stipulated in JIS L-1018, the rate of moisture absorption according to the method stipulated in JIS L-1018, the water holding capacity according to the method recommended by the Kagaku Seni Kensa Kyokai (Association of Chemical Fiber Testing in Japan. Hereinafter this is abbreviated to read KSKK.), the rate of surface water residue according to the method recommended by KSKK, the rate of moisture generation according to the method recommended by KSKK, and the rate of water vapor transmission according to a method based on the method stipulated in JIS L-1018.

Sample A: A knitted polyethylene terephthalate fabric (a commercially available polyester fabric made by and sold from Teijin Co., Ltd. of Japan under a trademark "Tetoron".) pile-stitched with cotton yarn.

Sample B: A knitted fabric of water-absorbent nylon having one surface processed to give a pile feeling.

Sample C: An ordinary knitted nylon fabric having one surface processed to give a pile feeling.

Sample D: A fabric of modified nylon (commercially available from Toray Co., Ltd. of Japan under a trade name "Cotran") having one surface processed to give a pile feeling.

Sample E: A nylon taffeta.

Sample F: A double-layered fabric of polyester and cupra yarns knitted together according to the present invention.

The results of the comparison tests are tabulated in Table II below.

TABLE II

|  |  | Samples | | | | | |
| --- | --- | --- | --- | --- | --- | --- | --- |
|  |  | A | B | C | D | E | F |
| Speed of Water Absorption (sec.) |  | 600 or more | 0–1 | 0–1 | 12–15 | 600 or more | 0–1 |
| Water Absorbency (%) |  | 26.0 | 17.1 | 9.6 | 10.8 | 1.9 | 32.4 |
| Water Holding Capacity (%) |  | 140 | 317 | 107 | 157 | 124 | 311 |
| Rate of Surface Water Residue (%) |  | 100 | 74 | 75 | 89 | 67 | 0 |
| Water Vapor Transmission Rate (%) |  | 58.4 | 52.1 | 60.8 | 49.8 | 47.4 | 62.6 |
| Speed of Moisture absorption (%) | 15 mins. | 0.2 | 0.3 | 0.2 | 0.1 | 0.2 | 0.3 |
|  | 60 mins. | 0.3 | 0.3 | 0.2 | 0.2 | 0.3 | 0.4 |
| Index of Moisture |  | 75 | 75 | 50 | 50 | 75 | 100 |

TABLE II-continued

|  | | Samples | | | | | |
| --- | --- | --- | --- | --- | --- | --- | --- |
|  | | A | B | C | D | E | F |
| Absorption Speed | | | | | | | |
| Rate of Moisture | 15 mins. | 3.7 | 5.0 | 4.4 | 3.7 | 4.7 | 4.5 |
| Generation (%) | 30 mins. | 4.8 | 5.7 | 4.9 | 4.4 | 5.5 | 5.9 |
|  | 60 mins. | 5.5 | 6.0 | 5.3 | 5.3 | 5.7 | 7.2 |
| Index of Drying Speed | | 76 | 83 | 74 | 74 | 79 | 100 |

EXAMPLE III

Samples of multi-ply fabrics, identified respectively by Aa, Bb, Cc, Dd, Ee and Ff and each comprised of the respective fabric A, B, C, D, E or F, an outer cloth layer and a cotton lining positioned between the outer cloth layer and the fabric A, B, C, D, E or F, were tested as to the speed of moisture absorption according to the method stipulated in JIS L-1018 and the rate of moisture generation according to the method recommended by KSKK. The results of the tests conducted are tabulated in Table III below.

TABLE III

|  | | Samples | | | | | |
| --- | --- | --- | --- | --- | --- | --- | --- |
|  | | Aa | Bb | Cc | Dd | Ee | Ff |
| Speed of Moisture | 10 mins. | 2.20 | 2.00 | 2.00 | 2.50 | 0.1 | 3.30 |
| absorption (%) | 60 mins. | 2.40 | 2.30 | 2.40 | 2.70 | 0.1 | 3.90 |
| Index of Moisture Absorption Speed | | 67 | 61 | 61 | 76 | 3 | 100 |
| Rate of Moisture | 15 mins. | 4.70 | 4.35 | 4.37 | 4.09 | 1.8 | 5.37 |
| Generation (%) | 30 mins. | 4.76 | 4.61 | 4.60 | 4.55 | 2.4 | 6.35 |
|  | 60 mins. | 5.01 | 4.63 | 4.95 | 4.86 | 2.9 | 6.82 |
| Index of Drying Speed | | 73 | 68 | 73 | 71 | 43 | 100 |

EXAMPLE IV

Using commercially available ski parkas of identical design each made up of a gas permeable, water repellent fabric as the outermost lining, a nylon taffeta as the innermost lining and a heat retentive cotton lining as an intermediate lining positioned between the outermost and inner most linings, the samples A to F were tested as to the change in humidity inside the respective ski parka at a given room temperature and a given room humidity, and the pattern of distribution of the sweat. The particulars of the tests were as follows.

1. A portion of the innermost lining, i.e., nylon taffeta, of each ski parka, which correspond in position to the back and arms of a wearer, were cut into halves of substantially identical size, one of which halves were subsequently replaced with the respective sample A, B, C, D or F of corresponding size. It is to be noted that since the commercially available ski parkas had the nylon taffeta as its innermost lining, one of them was used as the sample E.

2. The back of the respective wearer was marked to show skin areas corresponding to the innermost lining halves.

3. Temperature and humidity sensors were attached to the respective skin areas on the back of the respective wearer.

4. The ski parkas so prepared for the purpose of the tests were worn by the wearers, and the wearers were then allowed to exercise an activity.

5. During the activity, change in body temperature and that in humidity inside the respective ski parka were recorded. Only the change in humidity inside the ski parka is illustrated in the graph of FIG. 5.

6. After the activity, studies were made to find increment of the weight of each samples and also that of the undershirts worn by the respective wearers. The results of these studies are shown in the bar graph of FIG. 6 wherein, based on the measured weight increments, the percentage is used to show the amount of the sweat at a respective location relative to the initial weight measured before the tests.

Figure 5:
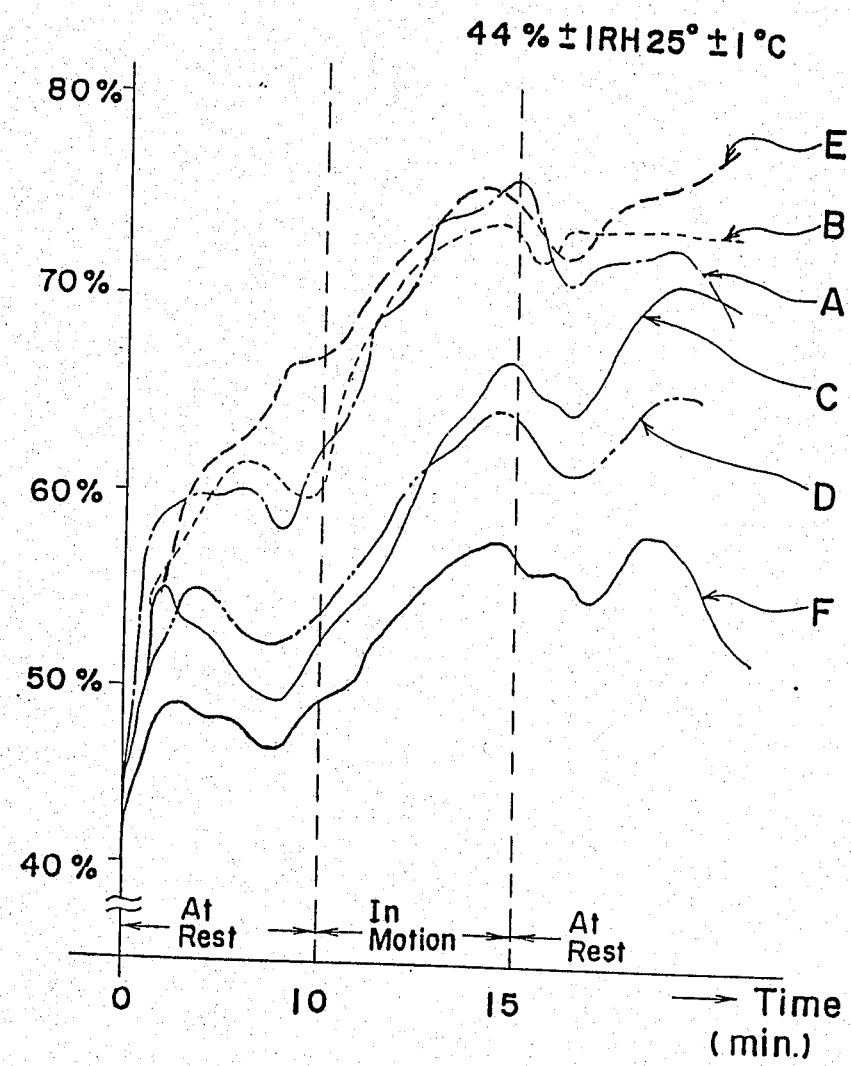
FIG. 5 is a graph showing the results of tests conducted to find the rate of change in moisture content relative to time.

From FIG. 5, it will readily be seen that the sample F, i.e., the double layered fabric lining according to the present invention has resulted in a surprising suppression of the increase of the humidity inside the ski parka and adjacent the wearer's body skin to a value lower than that exhibited by the other samples. This means that the use of the double-layered fabric lining according to the present invention ensures the wearer to feel comfortable to wear for a relatively prolonged period of time even though he or she gives relatively too much sweat.

Figure 6:
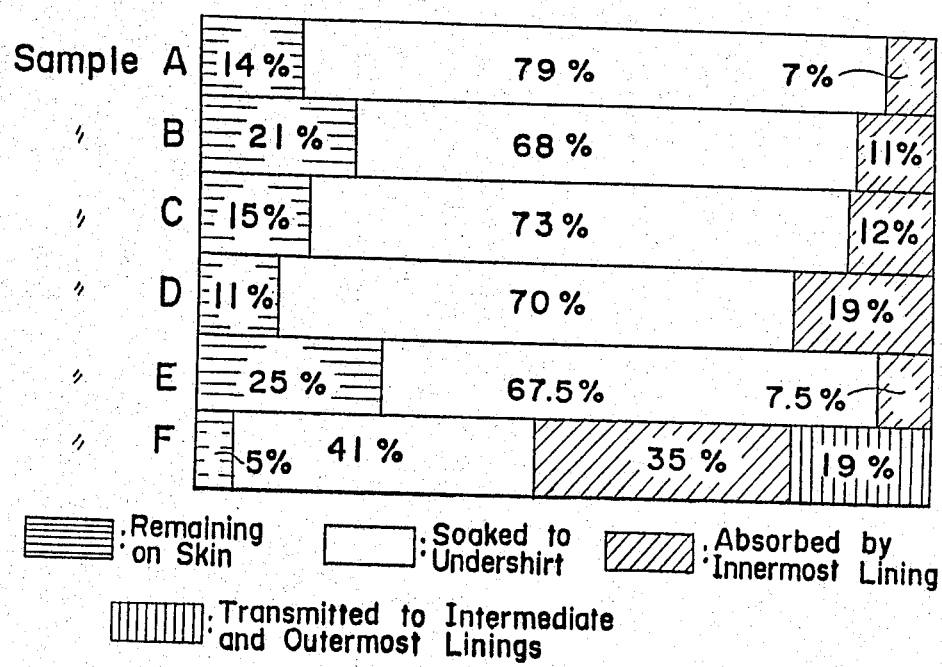
FIG. 6 is a bar graph showing the results of tests concerning the moisture permeability.

In addition, FIG. 6 clearly illustrates that the use of the fabric lining according to the present invention is effective to suppress the amount of the sweat remaining on the body skin and also the amount of the sweat soaked to the undershirt, as compared with those of the other samples, and therefore, is effective to cause the wearer not to feel stuffy and sticky.

In the foregoing description, it has been described that the first, or water permeable, fabric layer 4 and the second, or water absorbent, fabric layer 5 are connected, or simultaneously knitted, together to provide a single integer of double-layered fabric lining 3. However, in the embodiments to follow and to described with reference to FIGS. 7 and 8, the outer cloth layer 2, the water absorbent fabric layer 5 and the water permeable fabric layer 4 are all simultaneously knitted together by the use of any known circular knitting machine to provide a single integer of three-layered fabric most suited for use as a material for a sportwear. Referring first to FIG. 7 in particular, in view of the nature of the sportwear, the outer cloth layer 2 is preferably made out of polyester or nylon finished yarns so as to impart a relatively high resistance to both rubbing and breakage and may be in the form of a plain fabric, a Kanoko fabric, a mesh fabric or a pile fabric.

With respect to the water permeable fabric layer 4. It may be in the form of a plain fabric, a mesh fabric, a Kanoko fabric or a pile fabric.

The textile fabric according to the embodiment shown in FIG. 7 functions in a manner substantially similar to that according to the embodiment shown in FIG. 1. Specifically, in view of the fact that the sportwear is often worn by a wearer without any undershirt on and is, therefore, held in direct contact with the body skin, the liquid droplets 12a of sweat are first soaked to the water permeable fabric layer 4 held in contact with the body skin 6, which are in turn absorbed in the water absorbent layer 5 while moisture components 9 thereof pass through the interstices of the water permeable layer 4 and then absorbed in the water absorbent layer 5 whereat they can be condensed into liquid droplets 12. Therefore, as is the case with the embodiment shown in FIG. 1, the water permeable fabric layer 4 can be kept dry substantially.

Thus, since the moisture components originating from the sweat can be absorbed in the water absorbent layer 5 through the water permeable layer 4, air within a space between the body skin 6 and the sportwear will not be saturated and, therefore, the body skin 6 will not be substantially wetted. In addition, since the condensation of the moisture components 9 and the vaporization thereof take place only in the water absorbent layer 5, the body of the wearer covered by the water permeable fabric layer 4 is substantially free from any influence one or both of the heat, which would result from the wetting as a result of the condensation of the moisture component, and the heat of vaporization absorbed incident to the vaporization of the liquid droplets may bring about. Therefore, the sportwear using the textile fabric according to the present invention is comfortable to wear. However, it should be noted that the amount of the heat generated as a result of the wetting and that of the heat of vaporization, both referred to above, may vary depending on the extent of contact with the body skin 6.

As a method for knitting the layers 2, 4 and 5 together, it may also be performed by a flat knitting machine or a warp knitting machine.

By way of example, a knitted fabric having the three-layered structure wherein the outer cloth layer 2 is formed by the use of polyester finished yarns of a type having about 150 deniers, the water absorbent fabric layer 5 formed by cotton of a type having about 160 deniers and the water permeable layer 4 formed by alternately stitching polyester spun yarns of a type having about 160 deniers and polyester finished yarns of a type having about 150 deniers is most preferred as a material for the sportwear according to the present invention.

So far as the embodiment shown in FIG. 7 is concerned, the present invention will now be described by way of examples which are to be understood as set forth only for the purpose of illustration, not limiting the scope of the present invention.

EXAMPLE V

For the purpose of this test, the following samples G, H and I were prepared.

Sample G: A two-layered fabric wherein both of the outermost and innermost plies were knitted by the use of polyester yarns.

Sample H: A two-layered knitted fabric wherein the outermost ply and the innermost ply were respectively knitted by the use of polyester yarns and blended yarns of 50% polyester and 50% cotton.

Sample I: A three-layered fabric according to the present invention wherein the outermost and innermost plies were knitted by the use of polyester yarns and the intermediate ply was knitted by the use of cotton yarns, these plies being integrally knitted.

Each of the samples G, H and I weighing 1.25 g was applied with 0.45 g water drop placed on the innermost ply, and then pressed by the application of an external pressure of 0.1 kg/cm². Thereafter, adsorbent papers X and Y each weighing 1.20 g, were respectively placed on the outer surface of the associated outermost and innermost plies of the respective sample G, H or I to find the amount of residue of water, the amount of water transmitted and the water content. The results of the test are tabulated in Table IV below.

TABLE IV

| Samples | Change in weight of Paper X | Amount (& %) of Residue of Water | Change in weight of Paper Y | Amount of Transmitted Water | Water Content (g & %) |
|---|---|---|---|---|---|
| G | 1.20 g →1.60 g | 0.40 g (88.9%) | 1.20 g →1.20 g | 0 g | 0.05 g (11.1%) |
| H | 1.20 g →1.55 g | 0.35 g (77.8%) | 1.20 g →1.20 g | 0 g | 0.1 g (22.2%) |
| I | 1.20 g →1.25 g | 0.05 g (11.1%) | 1.20 g →1.35 g | 0.15 g | 0.25 g (55.5%) |

From the Table IV, it is clear that the sample I is effective to absorb and retain a more amount of water than the other samples, and therefore, when it is used as a material for the sportwear the sportwear is comfortable to wear.

EXAMPLE VI

Using the same samples as in Example V and each weighing 1.25 g, the time required for each sample, which had been given 0.25 g of water, to completely dry was measured. As a result thereof, it was found that the samples G, H and I took 87 minutes, 71 minutes and 54 minutes, respectively, and that the sample I is, therefore, effective to substantially avoid the possibility that the sportwear made out of the sample I may cause the wearer to feel stuffy when wetted.

EXAMPLE VII 6 samples of fabrics, identified respectively by J, K, L, M, N and P, of different kinds as described later, were tested as to the speeds of water absorption according to the method stipulated in JIS L-1096A and C, the rate of water absorption according to the method stipulated in JIS L-1018, the water holding capacity according to the method recommended by KSKK, the rate of surface water residue according to the method recommended by KSKK, the rate of water vapor transmission according to the method based on the method stipulated in JIS-1018, the moisture adsorbency and the rate of moisture generation.

Sample J: A two-layered knitted fabric wherein both of the outermost and innermost plies were knitted by the use of polyester yarns.

Sample K: A two-layered knitted fabric wherein the outermost and innermost plies were respectively knitted by the use of polyester yarns and blended yarns of polyester and cotton.

Sample L: A two-layered knitted fabric wherein the outermost and innermost plies were respectively knitted by the use of polyester yarns and cotton yarns.

Sample M: A two-layered knitted fabric similar to Sample K, but wherein loops of the polyester yarn used to form the outermost ply are caused to expose from the innermost ply.

Sample N: A three-layered knitted fabric wherein, according to the present invention, the outermost and innermost plies were knitted by the use of polyester yarns and polyester yarns with polyester staple fibers, with the intermediate ply being formed by cotton yarns.

Sample P: A three-layered knitted fabric wherein, according to the present invention, the outermost, intermediate and innermost plies were knitted by the use of polyester yarn, cotton yarns and polyester yarns.

The results of the comparison tests are tabulated in Table V below.

TABLE V

|  |  | Samples | | | | | |
| --- | --- | --- | --- | --- | --- | --- | --- |
|  |  | J | K | L | M | N | P |
| Speed of Water Absorption (sec.) (JIS L-1096A) |  | 0 | 600 or more | 9 | 5 | 0 | 0 |
| Speed of Water Absorption (sec.) (JIS L-1096C) |  | 600 or more | 600 or more | 527 | 27 | 0-1 | 0-1 |
| Rate of Water Absorption (%) |  | 31.1 | 25.7 | 16.7 | 28.9 | 35.5 | 40.3 |
| Water Holding Capacity (%) |  | 290 | 81.8 | 190 | 220 | 230 | 254 |
| Rate of Surface Water Residue (%) |  | 56.0 | 83.0 | 75.0 | 41.6 | 6.3 | 6.7 |
| Water Vapor Transmission Rate (%) |  | 60.1 | 59.0 | 53.0 | 54.1 | 59.3 | 63.9 |
| Moisture Absorbency (%) | 15 mins. | 0.12 | 0.14 | 0.15 | 0.15 | 0.13 | 0.12 |
|  | 30 mins. | 0.16 | 0.19 | 0.20 | 0.21 | 0.18 | 0.19 |
|  | 60 mins. | 0.17 | 0.31 | 0.34 | 0.36 | 0.36 | 0.33 |
| Rate of Moisture Generation (%) | 15 mins. | 0.72 | 1.53 | 1.75 | 2.03 | 1.98 | 1.89 |
|  | 30 mins. | 0.74 | 1.57 | 1.91 | 2.04 | 2.44 | 2.17 |
|  | 60 mins. | 0.88 | 1.61 | 2.06 | 2.06 | 2.52 | 2.22 |
| Index of Drying Speed |  | 100 | 183 | 234 | 234 | 286 | 252 |

Although the respective moisture absorbencies of all the samples J to P do not vary so much with respect to one another, it is clear that the Samples N and P are superior in speed of water absorption water holding capacity, water absorbency, surface water residue, water vapor transmission, moisture generation and drying speed to the other remaining samples.

It is to be noted that, in the embodiment shown in FIG. 7, the water absorbent layer 5 may be of a structure compared of unknitted cotton and yarns of cotton or any other suitable material. In addition, as is the case with the embodiments shown in FIGS. 2 to 4, one or both of the opposite surfaces of the outer cloth layer 2, may have a coating of water repellent agent and/or a windbreaking property. Alternatively, the yarns which have been processed with a water repellent agent may be used to form the outer cloth layer 2.

Furthermore, as shown in FIG. 8, a layer 14 having a water vapor permeability may be interposed between the outer cloth layer 2 and the water absorbent layer 5.

Although the present invention has fully been described in connection with the preferred embodiments thereby with reference to the accompanying drawings, it is to be noted that various changes and modifications are apparent to those skilled in the art. Such changes and modifications are, unless they depart from the scope of the present invention, to be construed as included therein.

What is claimed is:

1. A sweat absorbent textile fabric which comprises a first fabric layer having high water permeability and low moisture absorbency and a second fabric layer having a high moisture absorbency substantially higher than said first fabric layer in such that, when in use, the first fabric layer permits moisture to pass therethrough while the second fabric layer absorbs the moisture to keep the first fabric layer dry, the second fabric layer having a capacity to absorb moisture which is 200 to 300% by weight greater than that of the first fabric layer, the first fabric layer having a coarse stitching of 30 to 300 deniers while the second layer has a stitching of 40 deniers or more, providing that the second fabric layer has a finer stitching than the first fabric layer, and the first fabric layer being selected from the group consisting of polyvinyl chloride having a water retentivity within the range of 0 to 3.0% at 20° C. and 95% humidity and a relative thermal conductivity of 6.4 when that of air is taken as 1, a polyester having a water retentivity within the range of 0.6 to 0.7% at 20° C. and 95% humidity, and nylon having a water retentivity within the range of 8.0 to 9.0% at 20° C. and 95% humidity, while the second fabric layer is selected from the group consisting of cuprammonium rayon having a water retentivity of 21.0 to 35.0% at 20° C. and 95% humidity, rayon having a water retentivity of 25.0 to 30.0% at 20° C. and 95% humidity and cotton having a water retentivity of 24 to 27% at 20° C. and 95% humidity, said first and second fabric layers being integrally connected together to provide a double layered structure.

2. A fabric as claimed in claim 1, further comprising an outer fabric layer positioned on one side of the second fabric layer opposite to the first fabric layer, said outer fabric layer being employed when an outerwear is desired to be formed with the textile fabric.

3. A fabric as claimed in claim 2, wherein the outer fabric layer has a water repellent coating applied thereto.

4. A fabric as claimed in claim 2, wherein the outer fabric layer, the first fabric layer and the second fabric layer are all simultaneously knitted to provide a three-layered structure with the second fabric layer positioned between the outer fabric layer and the first fabric layer.

5. A sweat absorbent textile fabric as defined in claim 2, wherein further comprises a warm material layer provided between the second and outer fabric layers, said warm material layer being comprised such as foamed neoprene, urethane, down or cotton.

6. A sweat absorbent textile fabric as defined in claim 2, wherein further comprises a urethane coating formed on the inner surface of the outer fabric layer facing to the outer surface of the second fabric layer.

7. A sportwear made out of a sweat absorbent knitted textile fabric comprising an outer fabric layer, a water absorbent fabric layer and a water permeable fabric layer all being knitted integrally, said outer fabric layer being represented by a fabric having a good water vapor permeability, said water absorbent fabric layer positioned between the outer fabric layer and the water permeable fabric layer having a high water permeability and a low moisture absorbency and being knitted coarser than the water absorbent layer such that, when in use, the water permeable fabric layer permits moisture to pass therethrough while the water absorbent fabric layer absorbs the moisture to keep the water permeable fabric layer dry, the outer fabric being a knitted fabric having durability against the wind and rain and has good warmth retentivity, and the water absorbent layer being selected from the group consisting of cuprammonium rayon having a water retentivity of 21.0 to 25.0 at 20° C. and 95% humidity, rayon having a water retentivity of 25.0 to 30.0% at 20° C. and 95% humidity and cotton having a water retentivity of 24 to 27% at 20° C. and 95% humidity, while the water permeable layer is selected from the group consisting of polyvinyl chloride having a water retentivity within the range of 0 to 3.0% at 20° C. and 95% humidity and a retentive thermal conductivity of 6.4 when that of air is taken as 1, a polyester having a water retentivity within the range of 0.6 to 0.7% at 20° C. and 95% humidity, and nylon having a water retentivity within the range of 8.0 to 9.0% at 20° C. and 95% humidity.

8. A sportswear outfit made out of the sweat absorbent textile fabric according to claim 7, wherein the outer fabric is a knitted fabric having durability against the wind and rain and has good warmth retentivity; the water absorbent layer is selected from the group consisting of a water adsorbent cuprammonium rayon cotton, water absorbent nylon, an acrylic ester or a composite yarn made of a polyurethane elastic yarn with a water adsorbent yarn wound around the elastic yarn; and wherein the water permeable layer is selected from the group consisting of polyvinyl chloride, polyester, nylon, polypropylene, vinylidene, and vinylon.

* * * * *